United States Patent Office 3,606,737
Patented Sept. 21, 1971

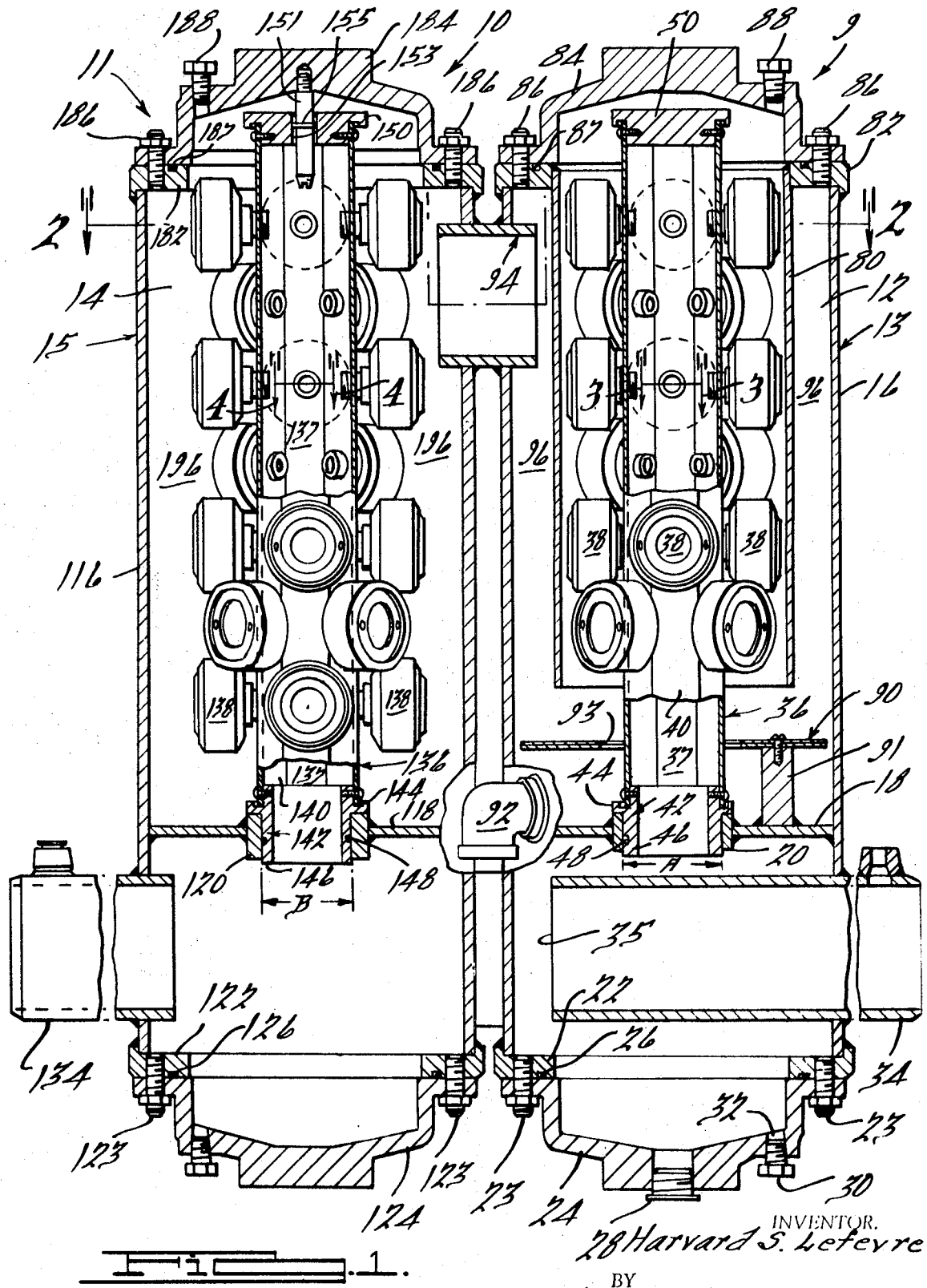

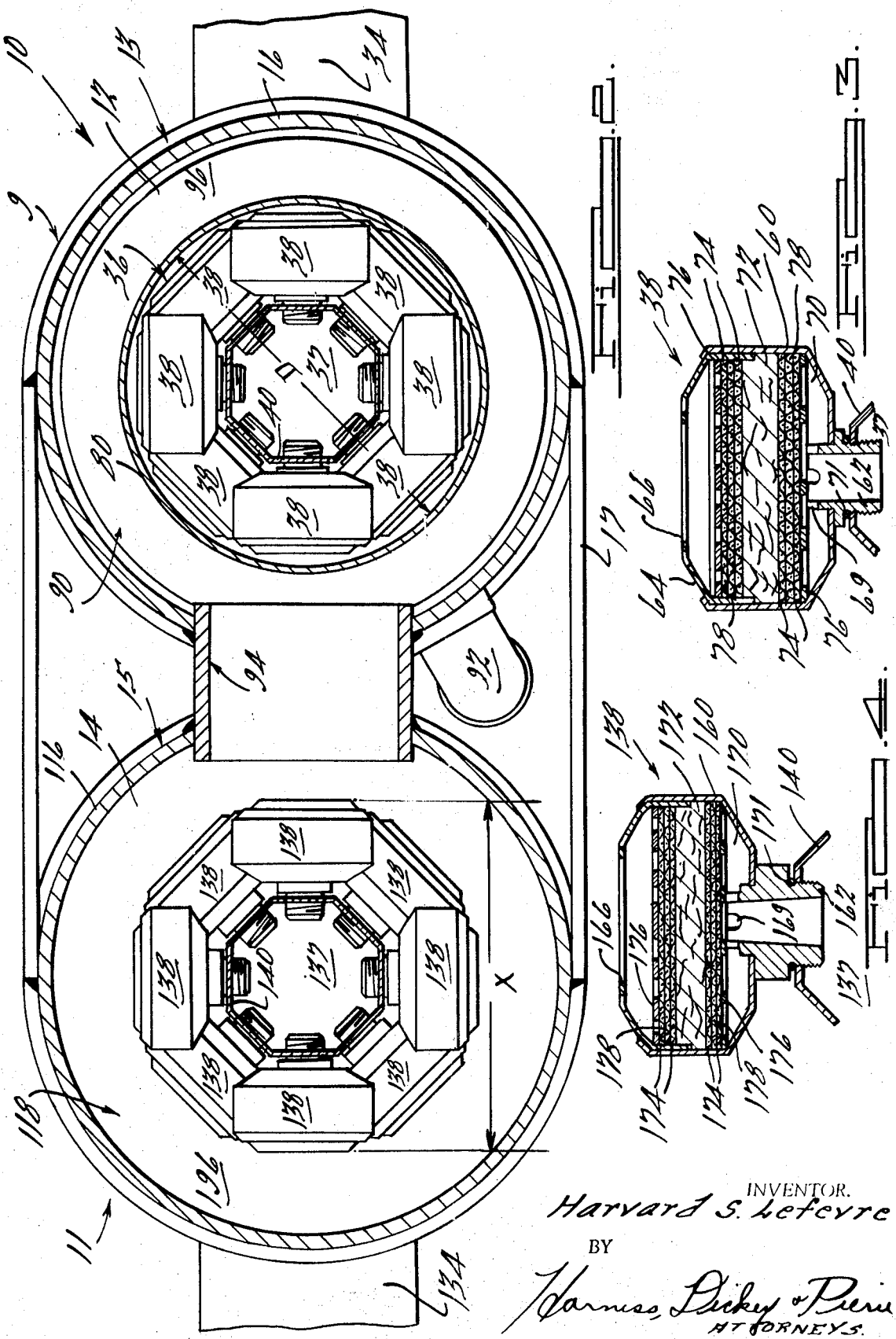

3,606,737
GAS DISPERSOID SEPARATOR
Harvard S. Lefevre, Ann Arbor, Mich., assignor to King Engineering Corporation, Ann Arbor, Mich.
Filed May 9, 1968, Ser. No. 727,969
Int. Cl. B01d 50/00
U.S. Cl. 55—319                                    23 Claims

ABSTRACT OF THE DISCLOSURE

A gas dispersoid separator utilizing separate interconnected coalescing and filtering chambers and including disposable assemblies each having a plurality of dispersoid removal elements.

---

The present invention relates generally to separation and purification systems and more particularly to novel apparatus for effecting the separation of a gas dispersoid from its gaseous suspension medium.

The present invention is generally a modification and improvement of the gas dispersoid separator shown and described in the U.S. Pat. 3,246,455 to L. Boddy, issued Apr. 19, 1966, and the disclosure of that patent is incorporated herein by reference. As is the case with the apparatus disclosed in the aforementioned patent, the present invention relates to a separator utilizing in series a wet coalescing action followed by a dry filtering action to remove the dispersoid. It differs from the prior apparatus, however, in that it is particularly suited to much larger gas flow rate applications. For example, the present invention has been commercially embodied in separators designed to handle 350 to 1000 s.c.f.m. of compressed air for removing oil and water mists, solids, and the like therefrom.

It is therefore a primary object of the present invention to provide a new and improved gas dispersoid separator which is relatively compact in construction, relatively simple and economical to manufacture and maintain, and which is capable of handling relatively large flow rates.

It is another object of the present invention to provide a gas dispersoid separator utilizing independent wet coalescing and dry filter housings in which the independent housings and their included chambers, as well as the coalescing and filter elements themselves, are of similar construction utilizing similar and interchangeable parts.

With separators for higher capacities a plurality of dispersoid removal elements are used for each stage and one problem with such separators is the inconvenience and difficulty in removing and replacing these elements upon contamination. Therefore, another object of the present invention resides in the provision of a high capacity separator having inexpensive and easily removable and disposable assemblies each including a plurality of either coalescing or filter elements, and wherein such assemblies cannot be accidentally interchanged one with respect to the other when being assembled with the separator. A related object concerns the provision of such a separator wherein these disposable assemblies are adapted to accommodate as many coalescing or filtering elements, as the case may be, as are required for the capacity of the separator.

Other objects, features, and advantages of the present invention will become apparent from the subsequent description and the appended claims, taken in conjunction with the accompanying drawings, in which:

FIG. 1 is a front elevational view with some parts shown in section and others broken away of a separator embodying features of the present invention;

FIG. 2 is an enlarged sectional view taken generally along the line 2—2;

FIG. 3 is an enlarged sectional view of one of the wet coalescing elements generally taken along the line 3—3; and FIG. 4 is an enlarged sectional view of one of the dry filter elements generally taken along the line 4—4.

Looking now to the drawings, a gas separator embodying features of the present invention is generally indicated by the numeral 10 and includes a scrubbing or wet coalescing assembly 9 including a chamber 12 and a polishing or dry filtering assembly 11 including a chamber 14. The scrubbing and polishing chambers 12 and 14 are defined by separate housing assemblies 13 and 15, respectively, which can be held together by a band structure 17. The housing assembly 13 includes a circular, vertically extending cylindrical body 16 which is open at both ends and has a solid web 18 located near the bottom end, which web 18 has a central opening defined by a centrally located support ring 20 which serves a purpose to be described. The bottom end of the cylindrical body 16 terminates with an annular flange 22; a bell shaped cap member 24 is secured to flange 22 by a plurality of threaded fasteners such as fastener 23. An annular seal 26 provides a fluid-tight seal between the cap 24 and flange 22. Cap 24 has a drain opening or fitting 28 which can be connected to a trap for receiving the liquids deposited in the bottom of cap 24. A pressure fitting 30 is connected to the cap 24 and communicates with the interior of the cylinder 12 via a bore 32 and provides means whereby a pressure gauge can be mounted and an indication of input pressure obtained. An inlet tube 34 is connected near the lower end of the body 16 and extends generally radially internally thereof beneath the web 18 and has its outlet 35 located substantially off center and proximate to the diametrically opposite surface of the body 16. The gas to be cleaned is transmitted under pressure into the lower end of the cylinder 16 via the inlet tube 34 and is impinged against the proximate wall surface of the cylinder 16 resulting in the loss of velocity to the impurities and heavier particles some of which will then drop into the cap 24 and will be drained out through the opening 28. The lighter gas, however, will flow upwardly from outlet 35 into the coalescing structure to be described. The opening 28 can be connected to a trap and then to a sump. The coalescing structure includes a readily removable and disposable assembly 36 which includes a plurality of coalescing (or condensing) elements 38 which are stacked vertically and located radially on an octagonally shaped support tube 40. The support tube 40 has at its lower end an annular adapter 42 which has a flange 44 which rests upon the supporting ring 20 of the web 18. The adapter 42 has a circularly shaped lower section 46 which is slidably matably located within the ring 20 with a seal 48 providing a fluid-tight seal therebetween. The top of the tube 40 is sealed by a cap assembly 50. Thus the gas from outlet 35 is transmitted into a passage 37 in support tube 40 and will be transmitted therefrom through the condensers or coalescers 38.

Each of the condenser or coalescing elements 38 is of an identical construction (see FIG. 3) and comprises a bell-shaped inner casing portion 60 provided with a threaded fitting 62 which is threadably received within a threaded opening in the support tube 40 with an O-ring 71 providing a seal therebetween. The condenser element 38 at its outer end has a generally frusto-conically shaped portion 64 which is secured to portion 60 and which has an axially extending restricting orifice or nozzle 66. The fitting 62 communicates with the interior of the condenser element by means of a plurality of radially extending passageways 69 for introducing inlet flow across the upper surface of a suitable condensing medium 72 disposed within the interior 70 of the casing for coalescing and agglomerating dispersoid particles passing therethrough. The condensing medium 72 is supported in place by two pairs of relatively fine mesh screens 74 which in turn are supported by a pair of reinforcing grids 76 engaging the inwardly sloping walls of the casing 60. The number of screens used can be varied depending upon the particular application involved. A pair of liners 78 of finely woven material such as nylon or Dacron or the like, are disposed between the screens 74 to prevent the condensing medium from escaping through the openings in the screens. The condensing medium 72 can be of a type known to those skilled in the art and specifically those types discussed in the above noted United States patent. The material 72 is presaturated to provide maximum effectiveness even at initial operation. Thus, the gas in the tube 40 is transmitted through the coalescing elements 38. As the liquid laden gas or air flows through the elements 38, the inherent cohesiveness of the separate particles causes them to coalesce and agglomerate and will result in a discharge from the elements 38 of droplets of fluid, i.e., such as oil, which are of a size sufficient to be mechanically separated. The gas and the agglomerated particles emitted from the nozzles 66 of the elements 38 are entrained radially outwardly against the wall of a cylindrical deflector tube 80 which extends generally coaxially with the support tube 40.

The deflector tube 80 is of a circular cross section and is fixed at its upper end to a flange 82 which is secured to the upper end of the cylindrical body 16. The deflector tube 80 is spaced from the inside walls of the cylinder 16 thereby providing for an annular path 96 for the gas to flow. The upper end of the cylinder 16 and also of the deflector tube or cylinder 80 is closed by a bell-shaped cap 84 which is secured to the annular ring 82 by means of threaded fastener assemblies 86 with a seal 87 providing a fluid-tight connection therebetween. The cap 84 is provided with a conventional pressure fitting 88 at which a pressure gauge can be secured for communication with the upper end of the chamber 12.

Thus the gaseous medium is transmitted through the coalescing elements 38 and will be directed downwardly and the large conglomerate droplets will be moved downwardly both by the velocity of the gas and also by the force of gravity. A baffle plate assembly 90 is secured to the web 18 by a plurality of vertical posts 91 and is located a preselected distance above the web 18 and below the bottom opening through the deflector tube 80. The baffle assembly 90 has a central opening 93 (through which the lower end of assembly 36 can extend) and also is in clearance relation with body 16 such that the heavy liquid droplets can flow through the clearance or opening 93 while the lighter gaseous medium will be deflected upwardly into the annular passageway 96 between the deflector cylinder 80 and the body member 16. Baffle assembly 90 can be provided with additional openings for drainage. A drain tube 92 is connected to the wall of the body 16 in communication with the space above the web 18 whereby the liquid collecting therein will be drained to a sump.

The substantially clean gas will then be transmitted through the passage 96 to an outlet tube 94 which is connected to the body 16 at its upper end. The outlet end of the tube 94 is connected to the filtering assembly 11. Tube 94 acts as an inlet into the filtering chamber 14.

Note that in providing the support tube 40 to be octagonally shaped, flat surfaces are provided for threadably securing the elements 38 thereto. This improves the threaded engagement as well as the sealing between the flat surface and the element 38. Four elements 38 can be located in any one radial plane and secured to alternate side walls of the support tube 40. The next row of coalescing elements 38 can then be located on the alternate side walls and can be nested in between adjacent ones of the next row of coalescing elements 38 (see FIG. 1). Thus it can be seen that with this construction for a given vertical length of support tube 40 more elements 38 can be mounted resulting in a compact structure.

The pressure fittings 30 and 88 provide convenient means for locating pressure gauges with the pressure fitting 30 being connected to the inlet pressure side of the coalescing chamber 12 and thereby providing for means for obtaining an indication of the inlet pressure and with the pressure fitting 88 being located at the outlet side of the coalescing chamber 12 thereby providing means whereby an indication can be obtained of the outlet pressure. The difference in the two pressures can then be utilized to determine the condition of the elements 38 and to also provide an indication as to when these elements should be replaced.

One substantial advantage in the structure as shown and described is the ease of replacement of the elements 38. Note that the coalescing elements 38 are part of a disposable assembly 36 which include the vertical tube 40. To replace all of the elements 38 it is merely necessary to remove the cap 84 and lift the assembly 36, along with the elements 38, vertically from the top and replace this with a new assembly 36.

Another substantial advantage is that the number of elements 38 can be varied. It may be that the coalescing assembly 9 was initially used to service a gas flow of 350 s.c.f.m. To do this only a minimum number of elements 38 (less than that shown in FIG. 1) need be utilized. In the event however, at some later date, it is desired that a higher capacity be serviced, i.e. 500 s.c.f.m., the basic apparatus can still be utilized and it is only necessary to remove the assembly 36 and replace it with one including more elements 38. As will be seen the above advantages are also present for the dry filter assembly 11.

The housing 13 for dry filter assembly 11 includes a circular, vertically extending cylindrical body 116 which is open at both ends and has a solid web 118 located near the bottom end, which web 118 has a central opening defined by a centrally located support ring 120 which serves a purpose to be described. The bottom end of the cylindrical body 116 terminates in an annular flange 122. A bell shaped cap member 124 is secured to flange 122 by a plurality of threaded fasteners such as fastener 123. An annular seal 126 provides a fluid-tight seal between the cap 124 and flange 122. An annular flange 182 is secured to the upper end of the cylindrical body 116. The upper end of the cylinder 116 is closed by a bell shaped cap 184 which is secured to the annular flange 182 by means of threaded fastener assemblies 186 with a seal 187 providing a fluid-tight connection therebetween. The cap 184 is provided with a conventional pressure fitting 188 at which a pressure gauge can be secured for communication with the upper end of the chamber 14 and hence a reading of input pressure can be obtained.

The gas is transmitted under pressure from the coalescing assembly 11 into the upper end of the cylinder 116 via the tube 94 and flows in an annular passage 196 around a readily removable and disposable filter assembly 136 which includes a plurality of filtering elements 138 which are stacked vertically and located radially on an octagonally shaped support tube 140. The support tube 140 has at its lower end an annular adapter 142 which has a flange 144 which rests upon the supporting ring 120 of the web 118. The adapter 142 has a circularly shaped lower section 146 which is slidably matably located within the ring 120 with a seal 148 providing a fluid-tight seal therebetween. The top of the tube 140 is sealed by a cap assembly 150. A pin 151 is threadedly secured to cap 184 and slidably extends through a bore 153 in cap assembly 150. An O-ring 155 in pin 151 provides a seal with bore 153; the pin 151 is provided to support assembly 136 and reduce vibration.

The gas from tube 94 is transmitted into the passage 196 and through the filters 138. Each of the filter elements 138 (see FIG. 4) is of an identical construction and, as will be seen, similar to elements 38 and comprises a bell shaped inner casing portion 160 provided with a threaded fitting 162 which is threadably received within a threaded opening in the support tube 140. A generally frusto-conically shaped outer portion 164 is secured to portion 160 and has an inlet opening 166. The fitting 162 communicates with the interior of the filter element casing and a seal 171 provides a seal between the fitting 162 and the threaded opening in the support tube 140. The outer end of the fittings 162 are provided with a plurality of radially extending passageways 169 for outlet flow. The gas flows from passage 196 through a suitable condensing medium 172 disposed within the interior 170 of the casing whereby the remaining particles passing therethrough are removed. The filter medium 172 is supported in place by two pairs of relatively fine mesh screens 174 which in turn are supported by a pair of reinforcing grids 176 engaging the radially inwardly inclined end portions of the walls of the casting portions 160 and 164. The number of screens used can be varied depending upon the particular application involved. A pair of liners 178 of finely woven material such as nylon or Dacron or the like, are disposed between the screens 174 to prevent the filter medium from escaping through the openings in the screens. The filter medium 172 can be of the type known to those skilled in the art and specifically those types discussed in the above noted United States patent. Thus, the gas in the passage 196 is transmitted through the filter elements 138 and into a central passage 137 through tube 140. A pressure fitting 130 is connected to the cap 124 and communicates with the interior of the chamber 14 via a bore 132 and provides means whereby a pressure gauge can be mounted and an indication of outlet pressure obtained. An outlet tube 134 is connected near the lower end of the body 116 and beneath the web 118 and communicates the clear gas out from chamber 14.

Note that, as with the support tube 40, the tube 140 is octagonally shaped and provides the same advantages relative to elements 138 as tube 40 provides relative to elements 38.

The pressure fittings 130 and 188 provide convenient means for locating pressure gauges with the pressure fitting 130 being connected to the outlet pressure side of the filter chamber 14 and thereby providing for means for obtaining an indication of the outlet pressure and with the pressure fitting 188 being located at the inlet side thereby providing means whereby an indication can be obtained of the inlet pressure. The difference in the two pressures can then be utilized to determine the condition of the elements 138 and to also provide an indication as to when these elements should be replaced.

The assembly 136 has the same advantages as assembly 36. Thus the filter elements 138 can be easily replaced since they are a part of the disposable assembly 136 which includes the vertical tube 140. To replace all of the elements 138 it is merely necessary to remove the cap 184 and lift the assembly 136 along the elements 138 vertically from the top and replace this with a new assembly 136.

Another substantial advantage is that the number of filter elements 138 can be varied to vary the capacity of the unit and still maintain the rest of the basic apparatus; this can be done merely by replacing the assembly 136 with another one including more filter elements 138.

In order to ensure that, in the replacement of assembly 36 or 136, the proper assembly is used, some differences between assemblies 36 and 136 are provided so that the possibility of accidental improper substitution of one for the other is obviated. In the first place the fittings 162 for filter elements 138 are longer and locate the outer end of elements 138 at a position such that the distance X between the ends of or opposite pairs of elements 138 is greater than the inside diameter Y of the deflector tube 80 (see FIG. 2). Thus dry filter assembly 136 could not possibly be substituted in housing assembly 13 for the wet filter assembly 36. Also note that the outside diameter A (FIG. 1) of adaptor 42 for filter assembly 36 is greater than the inside diameter B of ring 120 in housing assembly 15 thereby assuring that assembly 36 could not be erroneously substituted for assembly 136. Also the fittings 62 and 162 are of different diameters to be certain that wet elements 38 and dry elements 138 are not erroneously interchanged on support tubes 40 and 140.

It has been found desirable to utilize more dry filter elements 138 than wet filter elements 38. One reason for this is to decrease the pressure drop in the dry filter assembly 10 and another reason is to give longer operating time before filter changes are required; the wet elements 38 by their nature of operation have a longer life than the dry filters 138, which remove dispersoids by sorption, and hence a better balance is provided by using more dry filters 138. Note that the present invention permits by a simple substitution an increase in the number of dry filter elements 138 which results not only in greater filtering capacity, but also in a decrease in pressure drop since the total filter surface area will have been increased while the average depth will have been maintained the same. In practice the ratio of total dry filtering area to wet coalescing area is preferably not less than approximately 1.2 to 1.

In the drawings, the maximum number of wet elements 38 and dry elements 138 are shown; it should be noted that lesser numbers could be used for lower flow application. In installations for exceptionally large flow rates several coalescing and/or filtering housings of the type described may be connected in series, if desired.

While it will be apparent that the preferred embodiment of the invention disclosed in well calculated to fulfill the objects above stated, it will be appreciated that the invention is susceptible to modification, variation and change without departing from the proper scope or fair meaning of the subjoined claims.

What is claimed is:

1. Apparatus for separating a gas dispersoid from a gas comprising: housing means defining a first chamber; first means defining a first inlet into and a first outlet from said first chamber whereby the gas can be transmitted into and out of said first chamber, said first inlet terminating in said first chamber proximate to a deflecting surface for causing the direction of flow of gas to be substantially changed to cause some of the larger particles to be moved out of the flow stream; first removal means located in said first chamber in the fluid path between said first inlet and said first outlet for removing dispersoid particles from the gas, said first removal means comprising a first disposable assembly including a support member defining a passage in fluid communication with said first inlet and a plurality of dispersoid removal elements fixed to said support member, said passage having an inlet opening substantially out of line with the termination of said first inlet, each of said dispersoid removal elements having an inlet opening in communication with said passage and an outlet opening in communication with said first outlet, said passage in said support member being otherwise closed except for the paths from said first inlet through said removal elements, said removal elements each comprising coalescing means for coalescing and agglomerating dispersoid particles into larger conglomerate particles and including a condensing medium adapted to function in a condition in which it is saturated with the dispersoid material, said outlet opening defining a nozzle; support means for removably supporting said support member and hence said disposable assembly so that said disposable assembly can be readily removed and replaced; a deflecting member located around said support member and proximate to said nozzles to cause a substantial change in the direction of flow of the gas whereby larger conglomerate particles will be carried out of the flow stream; a second chamber defined by said housing means; second means communicating with said second chamber and defining a second inlet into and a second outlet from said second chamber whereby the gas can be transmitted into and out of said second chamber; a second removal means comprising a second disposable assembly including a second support member defining a second passage in fluid communication with said second outlet and a second plurality of dispersoid removal elements fixed to said second support member, each of said second plurality of removal elements having an inlet opening in communication with said second inlet and an outlet opening in communication with said second passage, second support means for removably supporting said second support member and hence said second disposable assembly so that said second disposable assembly can be readily removed and replaced, said second removal means comprising filter means for sorbing dispersoid particles with said removal elements including a sorbent filtering medium adapted to function in a condition in which it is unsaturated with the dispersoid material; and passage means connecting said first outlet to said second inlet.

2. The apparatus of claim 1 including means for providing access to said first and second chambers at which pressure indications can be obtained of inlet and outlet pressures in said first and second chambers.

3. The apparatus of claim 1 with said first and second chambers being defined by first and second independent housing, each of said housings having a removable cap closing the upper ends of said chambers, with said first and second disposable assemblies being removable through the opening defined by removal of said each of said caps.

4. The apparatus of claim 3 with said first disposable assembly having an interfering dimensional relation relative to said second support means whereby assembly of said first disposable assembly to said second support means is prevented, and with said second disposable assembly having an interfering dimensional relation relative to said deflecting member whereby assembly of said second disposable assembly into said first chamber is prevented.

5. Apparatus for separating a gas dispersoid from a gas comprising: housing means defining a chamber, means defining a first inlet into and a first outlet from said chamber whereby the gas can be transmitted into and out of said chamber, said first inlet terminating in said first chamber proximate to a deflecting surface for causing the direction of flow of gas to be substantially changed to cause some of the larger particles to be moved out of the flow stream, and removal means located in said chamber in the fluid path between said inlet and said outlet for removing dispersoid particles from the gas, said removal means comprising a vertically extending removable support member defining a passage in fluid communication with said first inlet and a plurality of dispersoid removal elements fixed to said support member, each of said dispersoid removal elements having an inlet opening in communication with said passage and an outlet opening in communication with said first outlet from said chamber, said passage having an inlet opening substantially out of line with the termination of said first inlet and being otherwise closed except for the paths through said removal elements.

6. The apparatus of claim 5 with said removal means comprising coalescing means for coalescing and agglomerating dispersoid particles into larger conglomerate particles with said removal elements including a condensing medium adapted to function in a condition in which it is saturated with the dispersoid material, said outlet opening defining a nozzle, a deflecting member located around said support member and proximate to said nozzles to cause a substantial change in the direction of flow of the gas whereby larger conglomerate particles will be carried out of the flow stream.

7. Apparatus for separating a gas dispersoid from a gas comprising: means defining a first chamber; means defining a first inlet into and a first outlet from said first chamber whereby the gas can be transmitted into and out of said first chamber; a first support member in said first chamber defining a first passage in fluid communication with said first inlet; a first plurality of dispersoid removal elements fixed to said support member, each of said dispersoid removal elements having an inlet opening in communication with said passage and an outlet opening in communication with said first outlet; means defining a second chamber; means defining a second inlet into and a second outlet from said second chamber whereby gas can be transmitted into and out of said second chamber; a passageway connecting said first outlet to said second inlet; and a second support member in said second chamber defining a second passage in fluid communication with said second outlet; a second plurality of dispersoid removal elements fixed to said second support member, each of said second plurality of removal elements having an inlet opening in communication with said second inlet and an outlet opening in communication with said second passage.

8. Apparatus as claimed in claim 7, wherein said first chamber has disposed therein support means for removably supporting said first support member so that said first support member and the removal elements fixed thereto can be readily removed and replaced, and said second chamber has disposed therein second support means for removably supporting said second support member so that said second support member and the removal elements fixed thereto can be readily removed and replaced.

9. Apparatus as claimed in claim 8, wherein each of said first and second support means includes means receiving the support member in a sliding and sealing connection.

10. Apparatus as claimed in claim 7, wherein each of said first plurality of dispersoid removal elements is saturated with the dispersoid material and each of said second plurality of dispersoid removal elements is unsaturated with dispersoid material.

11. Apparatus as claimed in claim 7, wherein each of said first plurality of dispersoid removal elements comprises coalescing means for coalescing and agglomerating dispersoid particles into larger conglomerate particles and contains a condensing medium adapted to operate in a condition in which it is saturated with the dispersoid material, and wherein each of said second plurality of removal elements comprises filter means for sorbing dispersoid particles and includes a sorbent filtering medium adapted to operate in a condition in which it is unsaturated with the dispersoid material.

12. Apparatus as claimed in claim 11, wherein the ratio of the effective cross-sectional area of said filtering medium to the effective cross-sectional area of said condensing medium is not less than approximately 1.2 to 1.

13. Apparatus as defined in claim 11, wherein each of said first plurality of dispersoid removal elements is substantially the same size and shape as each of said second plurality of dispersoid removal elements.

14. Apparatus as defined in claim 13, wherein said condensing medium is of the same composition as said filtering medium.

15. Apparatus as defined in claim 7, wherein each of said first plurality of dispersoid removal elements is substantially the same size and shape as each of said second plurality of dispersoid removal elements.

16. Apparatus as claimed in claim 15, wherein said first plurality of dispersoid removal elements are less in number than said second plurality of dispersoid removal elements.

17. Apparatus as claimed in claim 7, wherein said first inlet terminates in said first chamber proximate to a deflecting surface to cause the flow of gas therethrough to be substantially changed to cause some of the larger particles to be moved out of the flow stream, said first passage having an inlet opening substantially out of line with the termination of said first inlet and being otherwise closed except for the paths through said first plurality of dispersoid removal elements.

18. Apparatus as claimed in claim 7, further comprising means defining removable caps closing one end of each of said chambers, respectively, the support members and dispersoid removal elements fixed thereto being removable through the openings defined by removal of said caps.

19. Apparatus as claimed in claim 18, wherein means are provided for preventing insertion of said first support member into said second chamber and insertion of said second support member into said first chamber.

20. The apparatus of claim 7 wherein each of said support members is generally tubular and polygonal in cross-section, having a plurality of flat surfaces on which said removal elements are mounted.

21. The apparatus as claimed in claim 20, wherein said removal elements are located in a plurality of spaced parallel planes transverse to the longitudinal axis of each of said tubular support members, the removal elements in alternate ones of said plane being mounted on alternate ones of said flat surfaces on each of said support members and the removal elements in intermediate ones of said planes being mounted on intermediate ones of said flat surfaces.

22. The apparatus of claim 21 with said planes being spaced apart a distance less than the outside dimension of each of said removal elements in a direction transverse to said planes.

23. Apparatus for separating a gas dispersoid from a gas comprising: housing means defining a chamber, means defining a first inlet into and a first outlet from said chamber whereby the gas can be transmitted into and out of said chamber, removal means located in said chamber in the fluid path between said inlet and said outlet for removing dispersoid particles from the gas, said removal means comprising a vertically extending removable support member defining a passage in fluid communication with said first inlet and a plurality of dispersoid removal elements fixed to said support member, each of said dispersoid removal elements having an inlet opening in communication with said passage and an outlet opening in communication with said first outlet from said chamber, said chamber being generally cylindrical in configuration having a longitudinal axis and said support member having said dispersoid removal elements fixed thereto being disposed along said longitudinal axis in said chamber, and a generally cylindrical deflecting member disposed around said support member and the dispersoid removal elements fixed thereto, said deflecting member being located sufficiently proximate to the outlet openings of said dispersoid removal elements to cause a substantial change in the direction of flow of fluid therefrom whereby larger conglomerate particles will be carried out of the flow stream, said deflecting member being spaced a sufficient distance from the walls of said chamber to provide a flow passageway between said deflecting member and said chamber having a greater cross-sectional area than that existing between said dispersoid removal elements and said deflecting member.

References Cited

UNITED STATES PATENTS

| 519,275 | 5/1894 | Sellenscheidt et al. | 210—345 |
| 1,463,990 | 8/1923 | Wilson. | |
| 2,457,449 | 12/1948 | Davis et al. | 210—345 |
| 2,504,184 | 4/1950 | Dawson | 55—316 |
| 2,642,954 | 6/1953 | Le Valley | 55—319 |
| 2,698,063 | 12/1954 | Jaubert | 55—323X |
| 3,246,455 | 4/1966 | Boddy | 55—319 |
| 3,345,807 | 10/1967 | Von Felder | 55—462X |

FOREIGN PATENTS

| 839,016 | 12/1938 | France. |
| 530,953 | 8/1931 | Germany. |
| 5,372 | 1901 | Great Britain. |
| 308,790 | 5/1930 | Great Britain. |

DENNIS E. TALBERT, Jr., Primary Examiner

U.S. Cl. X.R.

55—322, 324, 327, 329, 332, 350, 426, 441, 462, 478, 484, 486, 508, Dig. 25; 210—345